United States Patent [19]

Le Faou et al.

[11] Patent Number: 4,827,797

[45] Date of Patent: May 9, 1989

[54] MOUNTING SUPPORT FOR A CYCLING SHOE

[75] Inventors: Daniel Le Faou, Melesse; Michel Mercier, Coulanges les Nevers, both of France

[73] Assignee: Ste LOOK, Nevers, France

[21] Appl. No.: 696,646

[22] Filed: Jan. 30, 1985

[30] Foreign Application Priority Data

Feb. 14, 1984 [FR] France ............................ 84 02198

[51] Int. Cl.⁴ .............................................. A43B 5/00
[52] U.S. Cl. ...................................... 74/594.6; 36/131; 36/132
[58] Field of Search ............... 36/131, 132, 117, 120, 36/122; 74/594.6, 594.4, 594.1, 594.2, 594.3, 560, 563; 280/11.3, 11.31, 11.32, 11.33, 11.34, 613, 617–620

[56] References Cited

U.S. PATENT DOCUMENTS

| | | | |
|---|---|---|---|
| 2,932,910 | 4/1960 | Brown | 36/122 |
| 3,740,873 | 6/1973 | Sturany | 36/117 |
| 4,335,531 | 6/1982 | Salomon | 36/117 |
| 4,351,120 | 9/1982 | Dalebout | 36/117 |
| 4,488,453 | 12/1984 | Drugeon et al. | 74/594.6 |

FOREIGN PATENT DOCUMENTS

| | | | |
|---|---|---|---|
| 495635 | 9/1950 | Belgium | 36/131 |
| 967277 | 10/1950 | France | 36/131 |
| 1030485 | 6/1953 | France | 36/131 |
| 59316 | 5/1954 | France | 36/131 |
| 1391970 | 2/1965 | France | 36/131 |
| 2315875 | 1/1977 | France | 36/131 |
| 2397319 | 2/1979 | France | 36/131 |
| 2403757 | 4/1979 | France | 36/131 |
| 2438867 | 5/1980 | France | 36/131 |
| 2464661 | 3/1981 | France | 36/131 |
| 2485226 | 12/1981 | France | 74/594.6 |
| 2556687 | 6/1985 | France | 74/594.6 |
| 80/01056 | 5/1980 | PCT Int'l Appl. | 74/594.6 |

OTHER PUBLICATIONS

Halliday Resnick, Physics, Parts I & II, John Wiley & Sons, Inc., Publisher, 1967, pp. 110–112.

Primary Examiner—Richard E. Moore
Assistant Examiner—Vinh Luong
Attorney, Agent, or Firm—Young & Thompson

[57] ABSTRACT

A mounting support for a cycling shoe is intended to be attached to the underface of the sole and adapted to cooperate with a fastener or retainer carried by the bicycle pedal. The mounting support is formed of material having high hardness and high strength and equipped with at least one pad, the lower end of which projects from the underface of the mounting support. The pad is formed of flexible and elastic material, thus providing greater comfort and safety while walking.

1 Claim, 2 Drawing Sheets

FIG.1
FIG.2
FIG.3
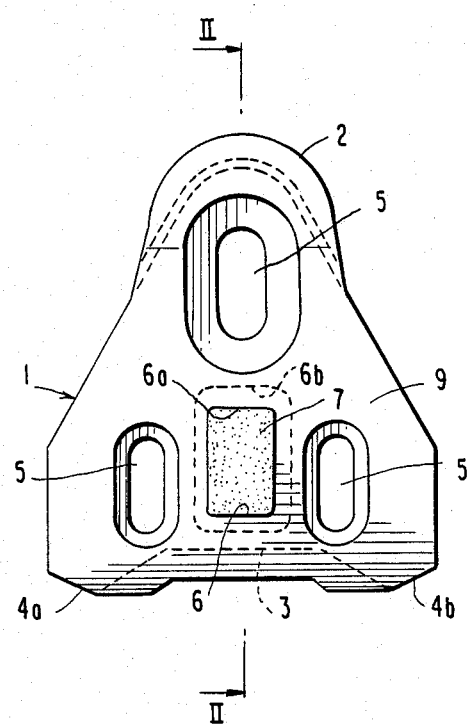
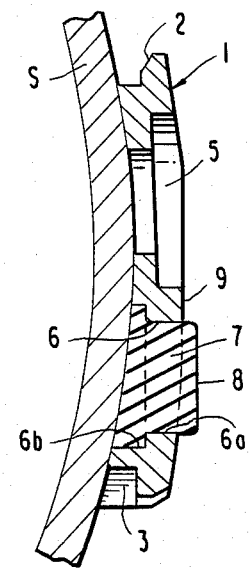
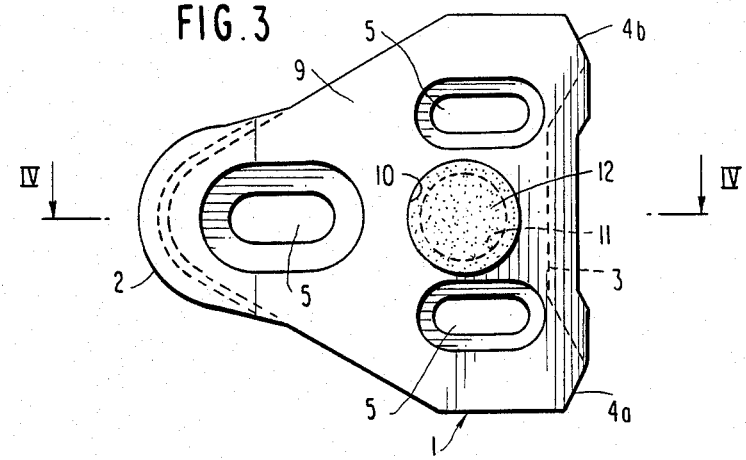

MOUNTING SUPPORT FOR A CYCLING SHOE

BACKGROUND OF THE INVENTION

1. Field of the Invention

This invention relates to a mounting support which is intended to be fixed beneath the sole of a cyclist's shoe and is adapted to cooperate with shoe-fastening or retaining means carried by a bicycle pedal.

2. Description of the Prior Art

It may be considered that mounting supports of this type fall into two categories.

In a first category, a mounting support for a so-called pedal-fitting is designed in the form of a small plate provided with a transverse groove for engaging the pedal-fitting on the rear sawtooth edge of a conventional pedal frame (equipped with a toe-clip) in order to prevent any slippage of the shoe in the longitudinal direction during pedaling motion. Pedal-fittings of this type are described for example in French patents No. 2,397,319 and No. 1,391,970 as well as in the French Certificate of Utility No. 2,438,867.

Mounting plates of the second category are designed for use with specially adapted pedals not fitted with toe-clips. In this case, the shoe is fastened to the pedal solely by retaining means carried by the pedal and engaged with the mounting support. The fastening system usually permits rapid disengagement of the cyclist's foot (without any manual assistance), either by intentional action produced by the cyclist prior to stopping or automatically in the event of a fall. Mounting supports of this type are illustrated for example in French Certificate of Utility No. 2,485,226 (FIG. 17), French patents No. 2,315,875 and No1,030,485 and in French patent Application filed by the present Applicant under No. 83-20185 (U.S. application Ser. No. 06/875,240).

Mounting supports for cycling shoes are usually made of high-strength material having a high degree of hardness and especially of light metal (aluminum alloy) or of plastics having high mechanical characteristics (acetal resin, for example). Thus the mounting supports can be securely fastened to the sole of the cycling shoe (usually by means of screws and/or nails) and are capable of effectively transmitting the pedaling efforts from the shoe to the pedal while having a very long service life. Unfortunately, the disadvantage of cycling shoes fitted with mounting supports of this type lies in the fact that these latter make it difficult to walk normally. In fact, an impact takes place each time the mounting support comes into contact with the ground and this produces a disagreable feeling. Furthermore, any material having high strength and hardness usually has a low coefficient friction with the result that the mounting support slides readily on smooth ground and that walking with these mounting plates consequently proves difficult and even presents a potential hazard.

In the first Addition No. 59,316 to French patent No 967,277, it has already been proposed to construct a pedal-fitting of flexible material (such as leather or rubber, for example), apparently for the sole purpose of absorbing sound while walking. The groove of the pedal-fitting is protected by a metal lining which is intended to prevent damage.

A similar design solution is described in Belgian patent No. 495,635.

Although it appears likely that these pedal-fittings facilitate normal walking, they do not prove entirely satisfactory at the present time since the considerable and sometimes violent pedaling efforts exerted by modern racing cyclists are liable to produce very rapid deformation of said pedal-fittings and to result in premature damage.

French patent No. 2,403,757 proposes a different solution which consists in providing beneath the cycling shoe a protective covering in the form of a non-slip pad. This pad is so arranged as to be capable of selectively taking up either of two positions, namely an active work position in which the pad covers the pedal-fitting and a withdrawn position for pedaling in which it uncovers said pedal-fitting. Once again, however, this solution does not prove wholly satisfactory since the cyclist is obliged to displace the position of the non-slip pad when he dismounts from the bicycle in order to walk and conversely when he remounts on the bicycle for pedalling. This operation is inconvenient and takes a long time to perform, which is unacceptable in certain sporting events and in particular cyclo-cross racing.

SUMMARY OF THE INVENTION

The aim of the present invention is to overcome the disadvantages of these mounting supports for known cycling shoes and accordingly proposes a mounting support which is actuated in such a manner as to ensure that the efforts required for pedaling are transmitted entirely and without deformation while making it easier to walk with cycling shoes fitted with mounting supports of this type.

This objective is achieved in the mounting support in accordance with the present invention by virtue of the fact that said support is formed of material having high hardness and high strength and that said support is equipped with at least one pad of flexible and resilient material which forms a downward projection with respect to the underface of the mounting support.

Thus the hard, high-strength portion of the mounting support receives and transmits the pedaling efforts whereas, during normal walking, the contact made between the cycling shoe and the ground is damped by the pad. In addition, the adherence of said pad on smooth ground is far superior to the adherence of the hard portion of the mounting support, with the result that walking is thus considerably facilitated.

Mounting of the pad within the pedal-fitting (shoe-attachment plate) can be performed in any suitable manner, in particular by bonding, simple force-fitting, resilient snap-action engagement or snap-action engagement combined with bonding. This connection is preferably separable in order to permit replacement of the pad in the event of wear.

The pad is advantageously provided on its bottom face with non-slip surface elevations and depressions for the purpose of increasing the coefficient of friction even further.

Finally, a plurality of pads can be provided on the mounting support in order to increase the ground contact area, or total surface area of the support which is in contact with the ground.

BRIEF DESCRIPTION OF THE DRAWINGS

Other features of the invention will be more apparent to those versed in the art upon consideration of the following description and accompanying drawings, wherein:

FIG. 1 is a bottom view showing a first example of construction of a mounting support in accordance with the invention;

FIG. 2 is a side view taken in cross-section along the vertical longitudinal plane II—II of FIG. 1;

FIG. 3 a bottom view showing a second example of construction of a mounting support in accordance with the invention;

DESCRIPTION OF THE PREFERRED EMBODIMENTS

Figure 4:
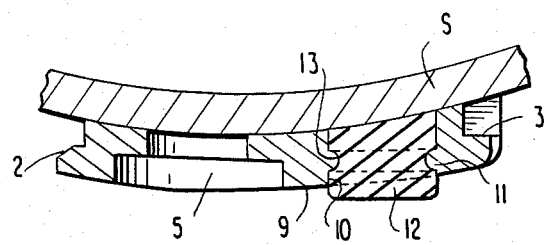
FIG. 4 is a side view taken in cross-section along the vertical longitudinal plane IV—IV of FIG. 3.

The mounting support 1 illustrated in FIGS. 1 and 2 is similar to the support described in French patent Application No. 83 20185 or U.S. application Ser. No. 06/875,240 filed by the present Applicant. Said mounting support is provided on its front edge with a rounded nose 2 and with a transverse recess 3 on its rear face, said recess being located between two arcuate guiding edges 4a, 4b. The curved top face of the mounting support 1 is applied against the underface of the sole S of the cycling shoe and secured to this latter by means of screws passed through elongated slots 5 formed in the mounting support in a suitable manner. These screws are not shown in the drawings for the sake of enhanced simplicity.

The nose 2, the recess 3 and the arcuate edges 4a, 4b serve to engage and guide the mounting support on the associated pedal. The function and operation of these different elements which are described exhaustively in the patent Application cited earlier are not re-stated in the present Application since they have no direct bearing on the invention and would complicate the description to no useful purpose. Should it be found desirable, however, reference may usefully be made to this prior-art patent.

The mounting support 1 is traversed by an opening 6 having a rectangular contour and provided with stepped walls so that the lower portion 6a (having a bottom orifice) is smaller than its upper portion 6b (having a top orifice).

The mounting support 1 is equipped with a pad 7 of flexible and resilient material having a stepped profile which is complementary to the profile of the opening 6 and having a thickness which is slightly greater than that of the mounting support. The pad 7 is fitted in position prior to attachment of the mounting support beneath the cycling shoe, simply by downward forcible engagement within the opening 6. After attachment of the mounting support beneath the shoe, the pad is therefore completely secured to the mounting support and the lower end portion 8 of said pad projects downwards with respect to the bottom face 9 of this latter.

The mounting support 1 is formed of material having high hardness and high strength, whether of light metal or high-strength plastic material (such as, for example, an acetal resin or a polyester elastomer). The pad 7 is of synthetic rubber which is a flexible material having good elasticity and a high coefficient of friction.

It is consequently found that all portions of the mounting support 1 which are subjected to mechanical stress during pedaling motion, namely the edges of the screw-slots 5, the round nose 2, the recess 3 and the arcuate walls 4a, 4b have high mechanical characteristics. While the cyclist is walking, however, the bottom end portion 8 of the flexible, non-slip pad 7 comes into contact with the ground, thus providing greater comfort and safety while walking.

In the second embodiment shown by way of example in FIGS. 3 and 4, the mounting support 1 is identical with the support of FIGS. 1 to 2 and is consequently designated by the same reference numerals. A cylindrical bore 10 extends right through the mounting support and is provided with an internal annular bead or flange 11. The pad 12 is given the shape of a cylindrical plug having an annular groove 13 which is complementary to the annular bead 11. The pad 12 is fitted in position within the bore 10 by resilient snap-action engagement, this mode of assembly being possible by reason of the flexibility and elasticity of the pad (rubber). At the time of assembly, the annular bead 11 fits within the annular groove 13. After assembly, the bottom face of the pad 12 projects beneath the underface 9 of the mounting support. The pad therefore comes into contact with the ground while walking is in progress.

The advantage of the form of construction under consideration lies in the fact that the pad is removable and can readily be replaced in the event of wear without any need for preliminary removal of the mounting support from the sole of the cycling shoe.

Figure 5:
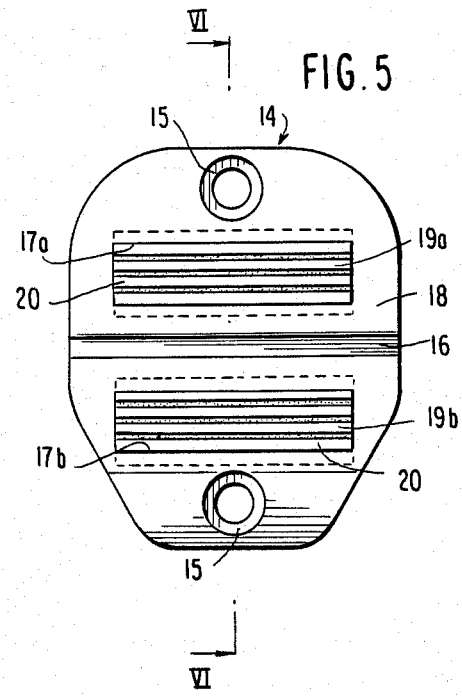
FIG. 5 is a bottom view showing a third example of construction, of a mounting support in accordance with the invention.
Figure 6:
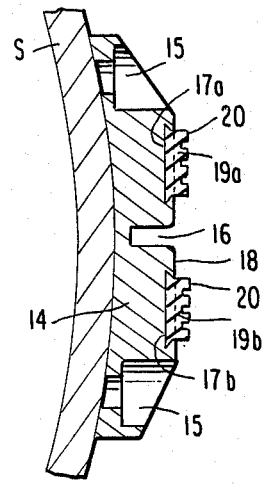
FIG. 6 is a side view taken in cross-section along the vertical longitudinal plane VI—VI of FIG. 5.

The third embodiment shown by way of example in FIGS. 5 and 6 relates to a mounting support of the conventional type or so-called pedal-fitting. This mounting support 14 is provided with holes 15 which are adapted to receive screws (not shown) for attaching said pedal-fitting to the bottom face of the sole S of a cycling shoe. As in the case of the mounting supports 1 described earlier, the mounting support 14 is fabricated from material having a high degree of hardness and high strength. Said mounting support is cut so as to form a transverse groove 16 which is adapted to engage on the top rear sawtooth edge of a conventional bicycle pedal frame.

The mounting support 14 is provided in front and behind the groove 16 with two recesses 17a, 17b which have a rectangular contour and the openings of which are located on the bottom face 18 of the pedal-fitting. These recesses each have a dovetail profile. The mounting support is equipped with two pads of flexible and resilient material which have the shape of small rectangular blocks 19a, 19b. These blocks have a profile which is complementary to that of the recesses 17 but have a thickness which is slightly greater than the depth of said recesses. The small blocks 19a, 19b are mounted by resilient snap-action engagement within the associated recesses 17a, 17b and may in addition be bonded within these recesses in order to forestall any danger of accidental detachment from the mounting support.

The inner faces of the small blocks 19a, 19b which project beneath the bottom face 18 of the mounting support are provided with raised portions in the form of transverse ribs 20 which are intended to obtain even greater adherence of the blocks on the ground while the cyclist is walking. However, it will be apparent that the ribs can be replaced by different types of non-slip surface relief such as, for example, striae or small studs.

As can readily be understood, it would not constitute any departure from the scope of the invention to equip a mounting support for a cycling shoe with pads which differ in shape, size and number from those contemplated in the three examples of construction described in the foregoing. It is wholly apparent that, for the purpose of comfortable walking, it is necessary to choose the largest possible area of contact between the pad or pads and the ground. However, the location and dimensions of said pad or pads must be chosen so as to ensure that they do not come into contact with the associated pedal or at least that they are not liable to interfere with normal operation of the assembly consisting of mounting support and pedal. Such arrangements are within the capacity of those skilled in the art.

What is claimed is:

1. A cyclist's shoe having a mounting support fixed to the underside of the sole thereof, the support having undercut outer edges and being formed of material having high hardness and high strength, and at least one pad of flexible and resilient rubber which has a coefficient of friction substantially higher than that of said support and which is spaced from said undercut edges and projects downwardly from the underface of said mounting support, said pad projecting through an opening that extends through said support, sasid opening and said pad having stepped profiles which permit downward posiioning of the pad within said support prior to attachment of said support beneath the sole of the shoe and which prevent removal of said pad after said attachment.

* * * * *